US006763030B1

United States Patent
Regev et al.

(10) Patent No.: US 6,763,030 B1
(45) Date of Patent: *Jul. 13, 2004

(54) SIMPLIFIED SWITCHING HUB FOR DATA COMMUNICATION NETWORKS

(75) Inventors: Alon Regev, Woodland Hills, CA (US); Zvi Regev, West Hills, CA (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,108

(22) Filed: Aug. 4, 1998

Related U.S. Application Data

(60) Provisional application No. 60/054,797, filed on Aug. 5, 1997.

(51) Int. Cl.[7] .............................................. H04L 12/28
(52) U.S. Cl. ...................................... 370/419; 370/369
(58) Field of Search ................................ 370/401, 422, 370/389, 392, 337, 390, 411, 412, 255, 369, 395.42, 419; 709/228, 224, 246; 710/244; 712/1

(56) References Cited

U.S. PATENT DOCUMENTS

| | | | | |
|---|---|---|---|---|
| 5,235,595 A | * | 8/1993 | O'Dowd | 370/392 |
| 5,774,698 A | * | 6/1998 | Olnowich | 712/1 |
| 5,875,190 A | * | 2/1999 | Law | 370/395.42 |
| 5,907,544 A | * | 5/1999 | Rypinski | 370/337 |
| 5,920,698 A | * | 7/1999 | Ben-Michael et al. | 709/224 |
| 5,923,654 A | * | 7/1999 | Schnell | 370/390 |
| 6,084,877 A | * | 7/2000 | Egbert et al. | 370/389 |
| 6,101,170 A | * | 8/2000 | Doherty et al. | 370/255 |
| 6,130,891 A | * | 10/2000 | Lam et al. | 370/401 |
| 6,233,246 B1 | * | 5/2001 | Hareski et al. | 370/422 |
| 6,307,860 B1 | * | 10/2001 | Joffe et al. | 370/412 |

* cited by examiner

Primary Examiner—Hassan Kizou
Assistant Examiner—John Pezzlo
(74) Attorney, Agent, or Firm—Dickstein Shapiro Morin & Oshinsky LLP

(57) ABSTRACT

An apparatus for interconnecting a plurality of data communication network segments. The apparatus includes a switching mechanism placed between the output circuitry and the physical transmission medium. This apparatus provides high speed short latency non blocking interconnection between a plurality of network segments while providing advanced bus and management features.

18 Claims, 4 Drawing Sheets

SIMPLIFIED SWITCHING HUB FOR DATA COMMUNICATION NETWORKS

This application claims priority to Provisional Application No. 60/054,797, filed on Aug. 5, 1997.

BACKGROUND OF THE INVENTION

1. Field of the Invention

The present invention pertains to the field of digital communications. More particularly, this invention relates to switching hubs for high speed local area networks.

2. Background

Ethernet is a specific implementation of what is generally referred to as a Carrier Sense Multiple Access/Collision Detection (CSMA/CD) protocol. In accordance with such protocols, only a single station is permitted to have access to the medium at any one time. A procedure is specified to resolve conflicts resulting from concurrent access attempts by multiple sources. For Ethernet, the details of this protocol are defined by the IEEE 802.3 specification.

A typical prior local area network is comprised of a set of communication agents coupled to a common communication medium. For example, an Ethernet local area network comprises a set of Ethernet compatible communication agents coupled to a coaxial, twisted pair, or fiber optics cable as a communication medium. In such systems a communication transaction between any two of the communication agents typically prevents communication among the other communication agents during the communication transaction.

One prior method for increasing the capacity of a local area network is to employ bridge circuits. Prior art bridge circuits typically couple together segments of local area networks. Typically, each segment comprises a set of communication agents coupled to a communication medium. A bridge circuit enables communication between each of the communication mediums.

Such prior are bridge circuits typically listen for communication messages on each of the communication mediums and propagate the appropriate communication messages to the other communication medium according to the network configuration. Communication messages are commonly referred to as communication frames.

Such a prior are bridge circuit typically buffers communication frames that require propagation to another communication medium. Thereafter, the bridge circuit forwards the buffered communication frames to the appropriate destination communication agents. Unfortunately, such buffering and forwarding of communication frames between communication mediums of the local area network increases the overall latency in the communication network.

Another prior art method for increasing the capacity of a local area network is to employ a switched hub circuit. A switched hub circuit is typically arranged in a "star" configuration wherein each segment of the local area network coupled to a unique serial communication port of the switched hub circuit. The switched hub circuit typically senses incoming communication frames, determines the destinations of the incoming frames, and switches the incoming communication frames to the appropriate outbound transmission paths.

Such switched hub circuits typically allow parallel data transfer between ports as long as the data transfer paths do not conflict.

Unfortunately, the switching functions performed by such prior art switched hub circuits are complicated by certain types of communication traffic. For example, if more than one communication agent attempts to transmit to the same communication agent, the switched hub circuit must select one of the transmissions and delay the other transmissions. The delayed transmissions increase the latency in the network.

In addition, broadcast transmissions and multicast transmissions require a switched hub circuit to switch a single incoming communication frame to multiple destination communication agents even though conflicting traffic may be under way to the destination communication agents. The multicast transmissions typically conflict with other transmissions, thereby increasing delays in the network.

The data transmitted in the network physical medium is in a serial form. However in most switched hubs the data is transformed (demultiplexed) to a slower multi-bit parallel format. This conversion is necessary to enable storage of the data in memory devices in the standard format of bytes and words. This conversion is also required in order to match the data rate to the read/write speed of memories and other processing devices. For this purpose and particularly when the serial data rate is 100 megabit/sec or above, the data is converted to a 32 or even 64 bits parallel format.

In most prior switched hubs the inbound data is stored, at least temporarily, in the receiving memory. This data is then transferred to the destination port circuitry for processing and subsequent transmission. The data transfer either involves a plurality of data buses and a switching mechanism between these buses, or a common bus shared by all port circuits. A typical prior art switched hub is shown in FIG. 1. In such a prior art switched hub, network segments b 1-n are each coupled to a corresponding packet processing unit (PPU) 3 which in turn are coupled to cross bar switching matrix 1. Each PPU includes a transmitter 8, a receiver 9, a media access controller 10, a multiplexor 13*a* and a demultiplexor 13*b*.

OBJECTS OF THE INVENTION

One object of the present invention is to provide a switching hub for a high speed communication network, especially Fast Ethernet and Gigabit Ethernet. Another object of the present invention is to provide a switching hub for a communication network that resolves conflicts among inbound communication frame that specify the same destination, thereby preventing collisions in the network.

Another object of the present invention is to provide a switching hub for a communication network that performs broadcast and/or multicast operations while avoiding collisions with conflicting communication traffic. Another object of the present invention is to provide a switching hub for a communication network that provides a flexibility in the switching hub makeup and enables system sizing and type alteration by means of replacing modules connected to a common motherboard.

These and other objects of the invention are provided by a communication system including a switched hub circuit that transfers incoming communication frames via a set of serial communication links. The switched hub circuit stores the incoming communication frames into a set of memory buffers that supply a set of outbound communication frames for transfer over the serial communication links. The switched hub circuit includes the means to decipher the destination of each message and a crossbar type switching matrix in the outbound physical layer to route the outbound transmission to the desired destination.

Other objects, features and advantages of the present invention will be apparent from the accompanying drawings, and from the detailed description that follows below.

SUMMARY OF THE INVENTION

In general, in one aspect, the invention features an apparatus for interconnecting N network segments each of which operates in accordance with a defined bus protocol such as IEEE 802.3 or similar protocols. The apparatus includes N physical interfaces to network segments, N Packet Processing Units (PPUs) 23, a Routing Controller (RC) 21, a Switching Matrix (SM) 1, an Address Management Unit (AMU) 17 and a Packet Broadcast Controller 20, as illustrated in FIG. 2. The input from each of the N network segments 6 connects to the input port of the corresponding Packet Processing Unit 23. The output port of each of the Packet Processing Units connects to a corresponding input in the Switching Matrix. The outbound line of each of the network segments connects to the corresponding output in the Switching Matrix. The Address Management Unit 17 and the Routing Controller 21 connect to all the Packet Processing Units via a multi-bit parallel bus 4. The Routing Controller connects to the switching matrix 1 and controls its operation.

Each Packet Processing Unit receives packets from the network segment 6, decodes the packet's source and destination addresses, and forwards this information to the Address Management Unit. When instructed by the Routing Controller 21, the Packet Processing Unit 23 retransmits the packet to the Switching Matrix 1 which provides a physical connection between PPU 23 and network segment 6. The Packet Processing Unit includes a Receiver 9, a Transmitter 8, a Media Access Controller (MAC) 10, and Memory 12, as illustrated in FIG. 3. The output of the Receiver connects to the input of the Media Access Controller. The Media Access Controller's Data Output Bus 14 connects to the memory's input, and the memory's output connects to the Media Access Controller's Data Input Bus 13. The MAC and memory are controlled by the Packet Processing Unit Controller (PPC) 11. The Receiver 9 decodes the data from the network and partitions it as 8 bit parallel data. The Media Access Controller 10 deciphers messages, detects collisions and errors, extracts packet addresses, maintains statistics, formats and sends out packets to the Transmitter, and provides "elasticity" buffers between the received data clock and the system clock. The Transmitter 8 takes the 8 bit parallel data from the MAC and transmits it as serial Manchester-encoded data. The Memory 12 is used for temporary storage of packets between the packet reception and the time the Packet Processing Unit 23 is instructed to send out the data. The Packet Processing Unit Controller 11 controls the MAC, keeps track of packets in memory, and interfaces to the Address Management Unit 17 and the Routing Controller 21. The transmitter 8, receiver 9 and MAC 10 are implemented as in their like numbered counterparts in prior art PPUs 3 as shown in FIG. 1.

The Switching Matrix 1 is constructed as a crossbar switch having N input signal paths (each carrying a single signal) and including N×N switching elements, each with an input and an output. Each switch element can connect one input to one output. Multiple switch elements can be activated simultaneously to connect multiple inputs to multiple outputs. This allows for a maximum of N connections between inputs and outputs at any one time. The use of the Switching Matrix increases the throughput of the switch to N times the throughput of any one network segment. The Switching Matrix is controlled by the Routing Controller 21 which receives the routing requests from the PPC 11 and activates the required connection between an input and an output when the requested output is inactive.

The PPC 11 receives the source and destination addresses of each packet from the MAC 10. The source addresses is stored in an address list that identifies the network segment associated with each address. The PPC searches its address list for the destination address of the packet and outputs a code identifying the path needed in the Switching Matrix 1 to transmit the packet to its destination network segment. The PPC sends new source addresses it received to the Address Management Unit 17 which distributes that source address to all the other PPCs. The PPC also sends Broadcast packets to the Broadcast Controller 20 which distributes those packets to all other PPCs.

In many networking protocols, such as Ethernet and Fast Ethernet, every packet contains two unique addresses: one address identifies the destination agent and one address identifies the source agent. One method of increasing network throughput is to "segment" the network by physically dividing it into multiple sections, each containing a unique subset of the agents on the original network. Without segmentation every packet is routed to every agent and therefore only a single packet can be transmitted on the whole network at any given time limiting the network throughput. With segmentation, the throughput of each segment is limited only by the traffic on that segment, not by the total network traffic.

The invention presented here increases the packet capacity of a network by supporting network segmentation with N simultaneous inter-segment connections and by implementing advanced packet filtering. N simultaneous inter-segment connections are achieved using a Switching Matrix that allows N simultaneous electrical connections. Each connection provides a path from the inbound line of the source segment to the outbound line of the destination segment. Each PPU receives on its segment, and decodes the source and destination addresses of each packet received. When both addresses are on the same network segment, the packet is local to the segment and the packet is not forwarded. When the destination address segment differs from the source address segment, the switch generates an electrical connection between the output port of the receiving Packet Processing Unit and the outbound physical medium of the destination network segment. Once such an electrical connection is established, the packet is retransmitted from the receiving PPU to its destination network segment.

In the meantime the content of the packet is stored in a memory for temporary keep.

To facilitate the apparatus functionality, a packet received as a single line serial data signal on the input port of the receiver of a PPU is typically Manchester encoded but other codes may be used. The signal is first decoded and multiplexed into a parallel format, typically but not necessarily 8 bits wide. This data is next processed in the MAC where the source and destination addresses are extracted and sent to the PPC 11. In the meantime the content of the packet is stored in a temporary storage while routing is determined. In the PPC, the requested destination address is compared with the complete list of known source addresses. If the destination address is found on the list and it is on a different segment than the packet's source address, a code is sent to the Routing Controller requesting a connection between the receiving PPUs output and the destination segment. The routing controller waits until the destination segment is not busy and then makes the electrical connection to the destination and commands the receiving PPU to recall the stored packet from memory and start the data retransmission.

In the cases where the PPC is unable to determine the transmission path of a received packet because it is not in its lookup table, it will tag that packet as a Broadcast packet, bound to be sent to all the network's segments. In prior art switches using Crossbar switching matrices such Broadcast transmission is performed by connecting all the output ports to a single inputs which originated the broadcast packet, and then transmitting that packet to all the ports simultaneously. In this type of architecture the controller must wait for all the ports to stop their current transactions, and then hold the system in this state until the complete broadcast packet is transmitted. This operation blocks the entire switch for long periods of time and greatly reduces the data transfer rate capability of such switches.

In the invention presented here this problem is eliminated using the Broadcast Bus. Every time a packet is received with an unknown transmission path, it is sent to all the PPUs via the Broadcast bus. Each PPU receives the packet from the bus and transmits it through its serial output to the network segment to which it is connected. Since at all times each port is connected to one of the network segments, broadcast packets transmitted from all the PPUs are in fact transmitted to the network segments. This method does not block the switch while broadcasting and yet guarantees the broadcast to all the segments.

To enable each PPC to determine the transmission path of received packets all the PPCs must share a common data bus base for the locations of all the communication agents on the network. In the invention presented here each PPC contains its own list of destination transmission paths. In order to guarantee that the lists in all the PPCs are identical and updated the content of these lists is controlled by the Address Management Unit.

Per port switching capability was developed initially for 10 Mbit/sec. networks. Subsequently, increases in network speed required an ever growing level of multiplexing and intra switch bus width in order to accommodate the slower speed of memory devices used in the process and to allow adequate signal bandwidth to guarantee unimpeded data traffic. With the present invention, the per port switching technology can be efficiently and effectively extended to Fast Ethernet, Gigabit Ethernet and other high speed networks as well because the necessity for demultiplexing the entire packet is eliminated, and in all but a few cases, serial data received in the PPU is retransmitted from the same PPU which enables a modular and extendable system..

The prior state of the art may be best understood by referring to FIG. 1. Under the conventional approach to Ethernet network expansion, a very large bus or a plurality of smaller ones would have been necessary to provide per port switching capability on and between multiple network segments supported within a central switching hub. With the invention described herein, however, the switching matrix 1 that is currently used can provide N simultaneous inter-segment connections each carrying the maximum network data flow. A typical switching matrix of the type which could be used with the invention is shown in FIG. 5.

In prior art switches, the switching mechanism 1 is placed between the parallel output of the receiving MAC and the parallel input of the transmitting MAC. One aspect of the novelty of this invention is the placement of the switching matrix between the Manchester encoded serial output of the transmitting MAC and the outbound transmission line of the destination network segment. One advantage of this invention is that the received inbound data is processed and retransmitted in a single Packet Processing Unit and the routing and switching of that data to its final destination is done in the outbound transmission physical layer; each PPU is a stand alone circuit where, except in the case of broadcast, data is transferred into the port and out of the port through single line interfaces only. A Switching Hub based on this invention can be constructed as a motherboard with the port circuits as plug-ins to the motherboard. The number and size of buses on that motherboard is fixed and independent of the number or type of PPUs. The number of PPUs on a switching hub according to this invention depends only on the number of switching elements in the switching matrix used.

Other advantages and features will become apparent from the following description of the preferred embodiment and from the claims.

BRIEF DESCRIPTION OF THE DRAWINGS

The present invention is illustrated by way of example and not limitation in the Figures of the accompanying drawings in which like references indicate similar elements, and in which.

DETAILED DESCRIPTION OF THE PREFERRED EMBODIMENT

Figure 1:
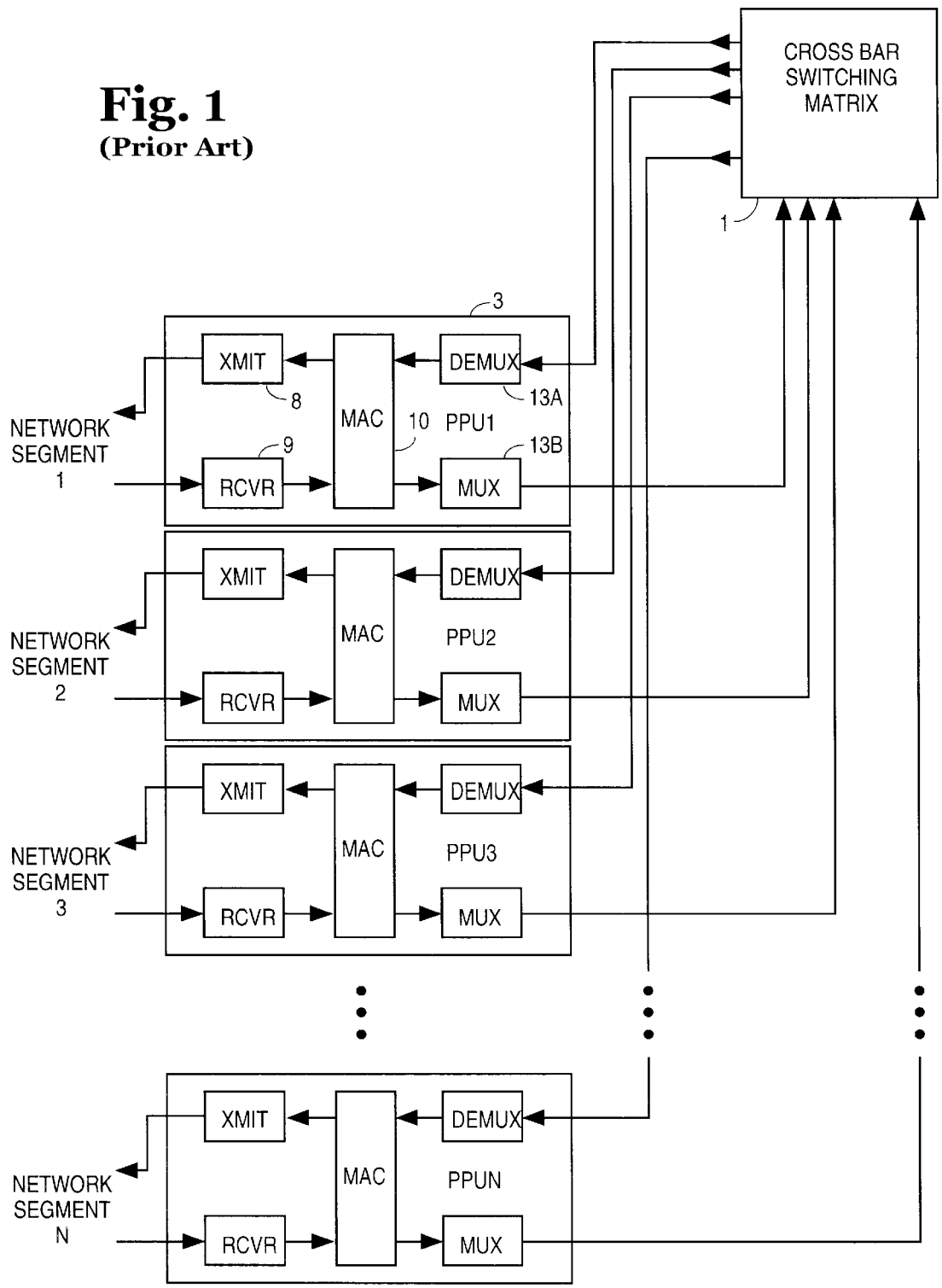
FIG. 1 illustrates a prior art switched hub.
Figure 2:
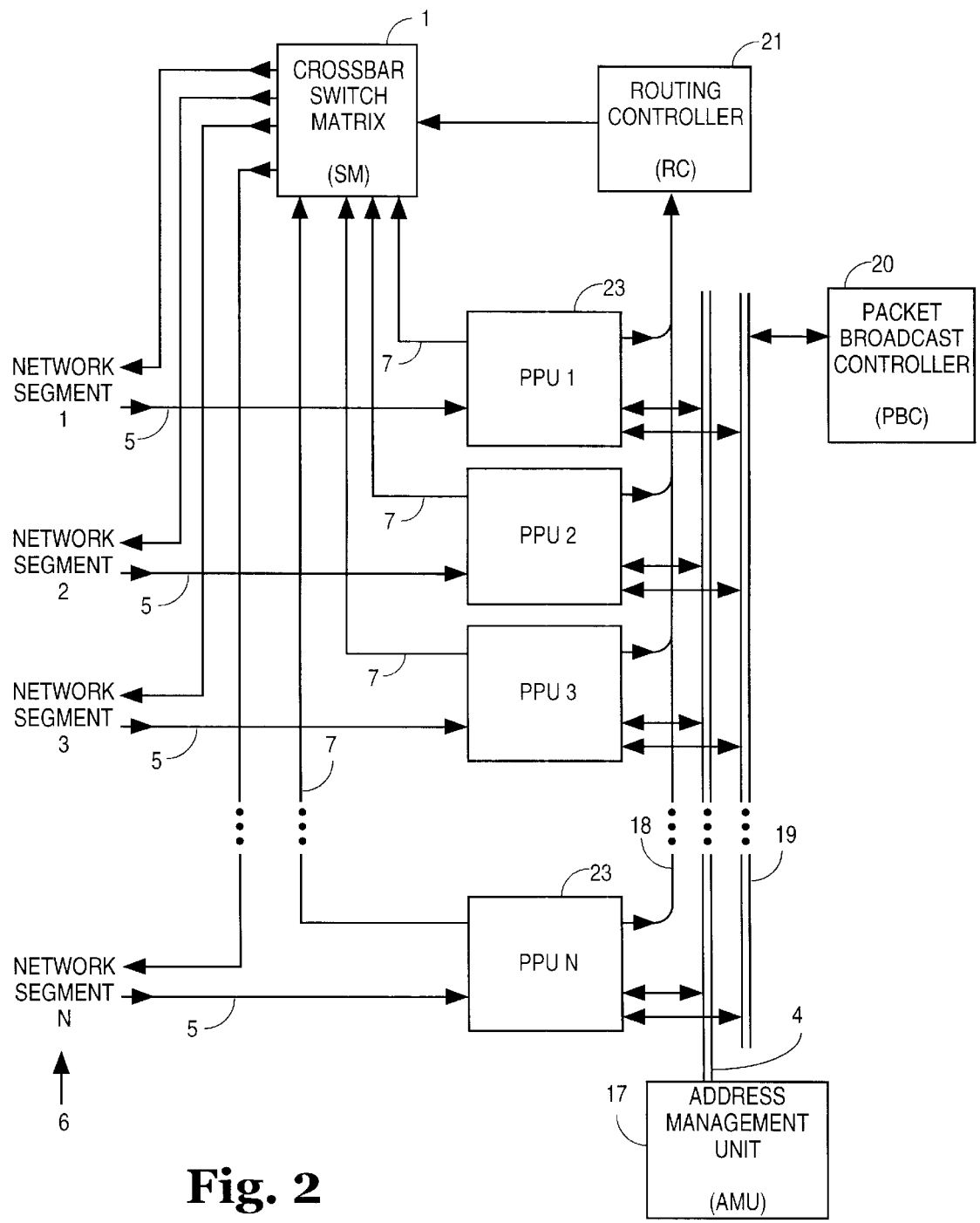
FIG. 2 illustrates the overall architecture of a preferred embodiment of the simplified switched hub.
Figure 3:
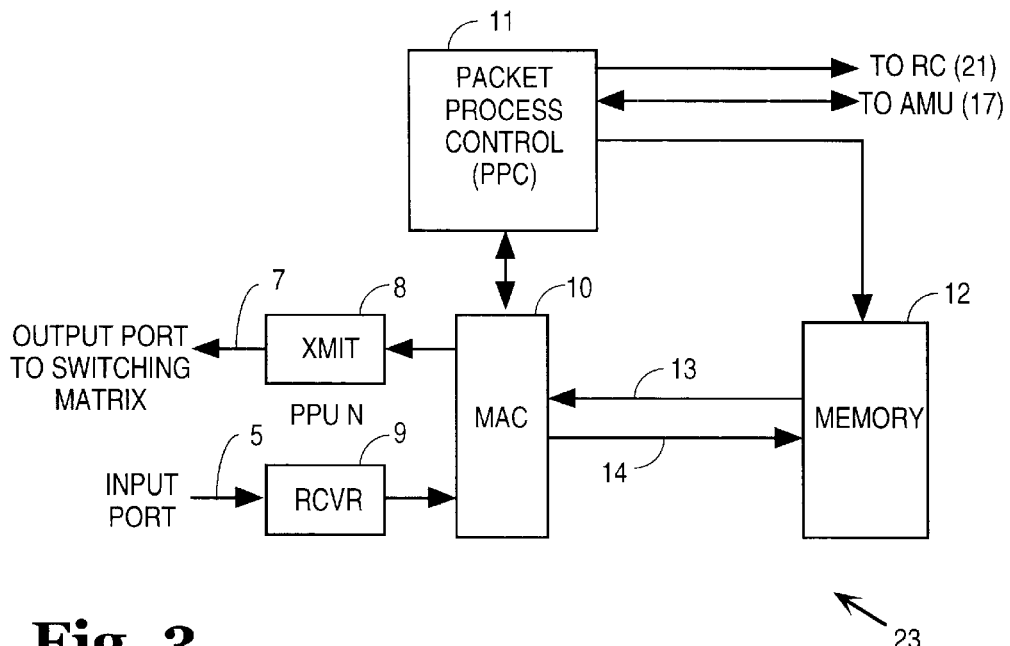
FIG. 3 illustrates the Packet Processing Unit in the simplified switched hub.
Figure 4:
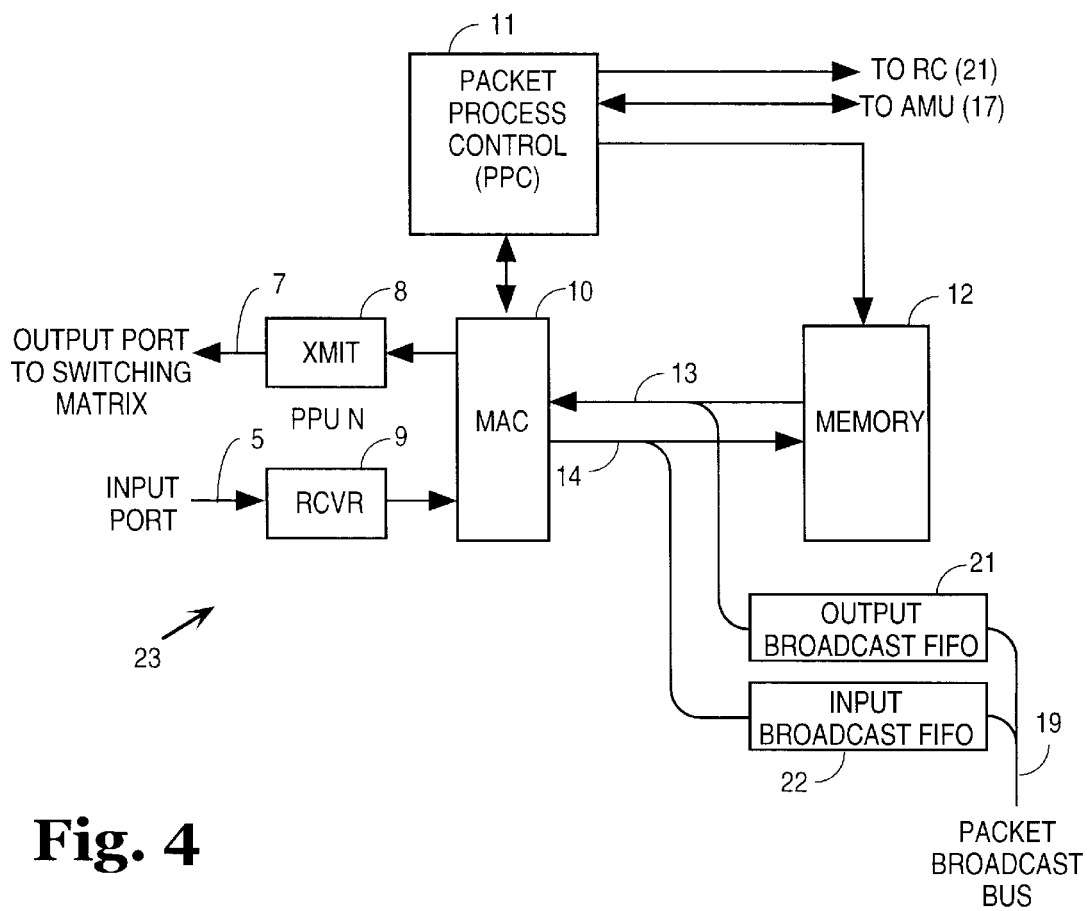
FIG. 4 illustrates the Packet Processing Unit in the preferred embodiment of the simplified switched hub.
Figure 5:
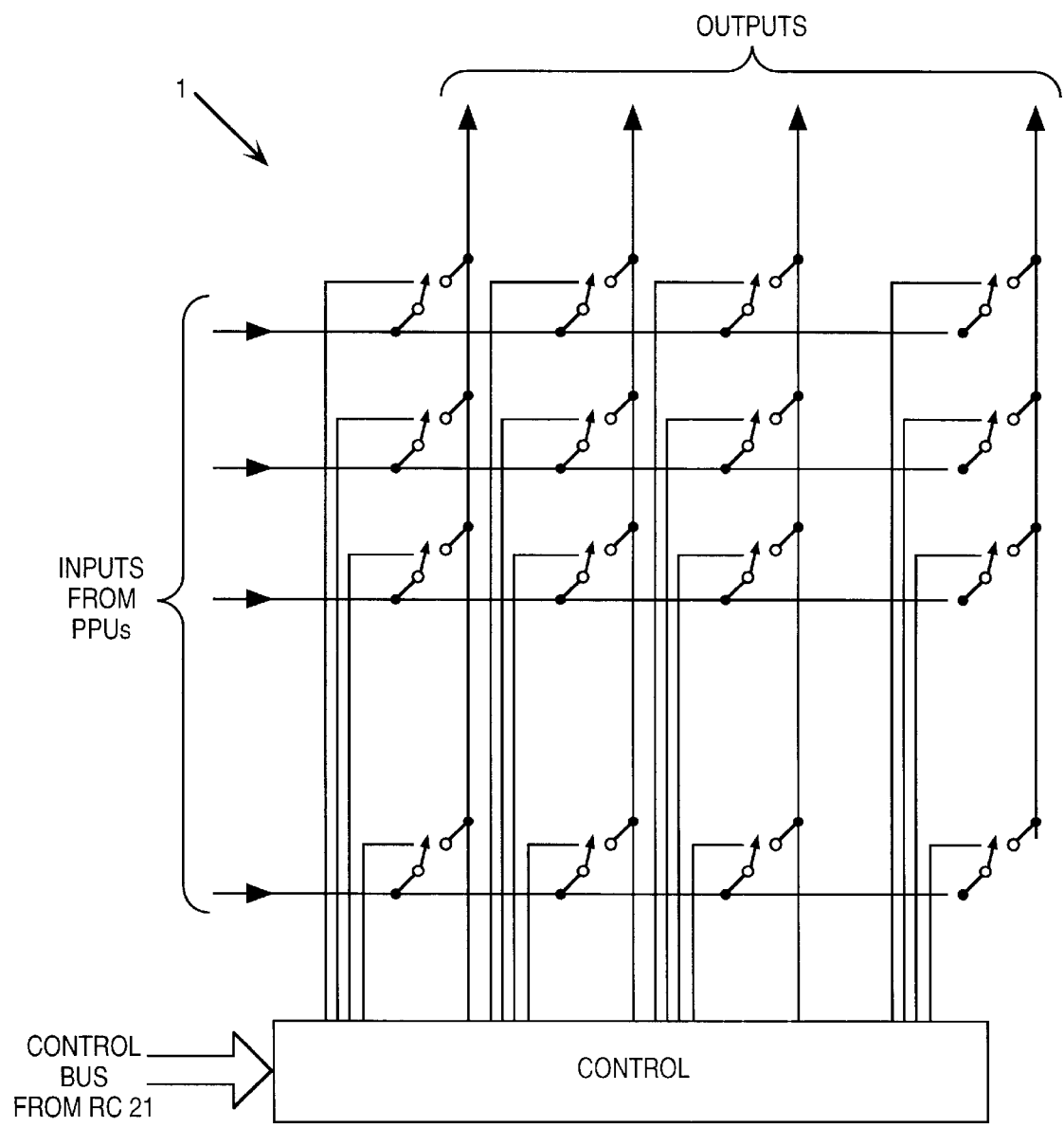
FIG. 5 illustrates the concepts of a crossbar switching matrix.

Data is transmitted on the network in a serial fashion bit after bit. In order to retain the integrity of the data, it is modulated using Manchester, or similar, format which allows the recovery of both the clock and the data used in the transmission of the received data. The preferred embodiment described below is best understood with reference to FIG. 4. In the preferred embodiment of a Packet Processing Unit (23), the serial data on the inbound line (5) of a network segment enters the PPU at the input port and is processed by the receiver (9). This processing includes data and clock recovery, de-framing of the received data, and decoding of the Manchester encoded serial data into non-encoded binary. The output of the receiver is the serial data of the packet, demultiplexed into a word of i bits (commonly but not necessarily 8 bits wide) is transferred to the Media Access Controller (MAC) (10) for further processing. This further processing includes another level of demultiplexing, yielding a word of j bits (j is commonly but not necessarily equal to 32) wide data output (4).

The data transmitted over the network is arranged in packets in accordance with the specifications of IEEE 802.3 or other similar specifications. As such all packets are made of a series of well defined bit blocks. According to the IEEE 802.3 specification, the first part in a packet is the Header which is used to synchronize the receivers clock recovery circuit. The next block of 48 bits is the destination address, followed by a second 48 bits blocks of the source address, followed by the remainder of the message.

The data emerging from the MAC (10) on the bus (14) is stored in a sequential fashion in the memory (12). Meanwhile the first three 32 bit wide words containing the source and destination addresses of the packet are also written into the Packet Processing Controller (11). The PPC contains a Content Addressable Memory (CAM) which holds a list of addresses, each with an associated code indicating the network segment containing an agent with that address. The list in the CAM is compiled from the source addresses of messages received along with a code indicating the packet's source segment. When a destination address is passed to the CAM, the CAM automatically compares that address with all addresses in its list, and if a matching address is found the CAM outputs the associated code to the Routing Controller (2). This code indicates which source PPU and which destination network segment needs to be connected to provide the routing path for the packet being processed. If the code indicates that the source and destination network segments are one and the same, no action needs to be taken by the switch and the received packet is discarded. However if the CAM indicates a destination network segment different from the PPU on which the packet was received, the packet is routed to the destination network segment. This routing process involves several operations by various parts os the apparatus: The Routing Controller (RC) (21) receives the routing request code from the PPC 11 and monitors the destination network segment to determine when the outbound line of that segment is not in use. When this condition is met, the RC (21) commands the switching Matrix (SM) (1) to activate an electrical path required to route the packet to its destination. Next the RC (21) signals the source PPC (11) to retransmit the packet from the memory (12) through the MAC (10), the transmitter (8), and the SM (1), to its destination.

The transmission process is comprised of the following operations: The data is read from the memory (12) and into the MAC (10). In the MAC (10) the j bit wide data is multiplexed to an n bit format, and a synchronization header is added to the packet. The transmitter 8 takes the n bit data from the MAC multiplexes it and outputs it in a Manchester encoded serial format to the Switch Matrix (crossbar switch) (1) via the output line (7). At this point in time the crossbar switch (1) was already set by the RC (2) and there is a physical connection through the Switch Matrix (1) between the output line (7) at the transmitting PPU output to the desired destination physical medium, and the data transmitted from the transmitter (8) actually flows directly to its destination. When the transmission of the packet is complete, the PPC (11) signals the RC (21) which disconnects the now unused connection in the switch matrix (1).

Some packets are destined not to a single address, but are to be distributed to a pre-defined group of agents or disturbed to all agents simultaneously. These packets are identified by special address codes. Distributing such packets through the crossbar switch (1) is not practical. Instead, each PPU is equipped with two special FIFOs 21 and 22. When a multicast or broadcast type packet is received, it is written into the broadcast output FIFO (21) instead of the memory (12). The PPC (11) then signals a Packet Broadcast Controller (PBC) (20) about an impending broadcast or multicast packet waiting to be distributed. When the broadcast distribution bus (19) is not in use, the PBC signals the source PPC to start sending the message. The input broadcast FIFOs (22) on the destination PPUs receive the messages from the output FIFOs (21) on the source PPU via the broadcast distribution bus (9). At this point the control of the further distribution of the broadcast packet is transferred to the PPC (11) which in turn sends a request to the RC (2) to route the next message, transmitted on the transmission line (7) to the physical line to the addressed network segment (6).

We claim:

1. A switch for use in a packet switched communication network and for interconnecting a plurality of network segments, said switch comprising:

a) a plurality of packet processing units, each separately coupled to a respective network segment for receiving packets of data therefrom, wherein each packet processing unit decodes each packet of data received from its network segment to determine a source and a destination address;

b) a switching matrix coupled to each of said plurality of packet processing units and to each of said network segments for transmitting said packets of data from said packet processing units to said network segments;

wherein a packet received in one of said packet processing units is transmitted from that packet processing unit to a different network segment by the switching matrix when the destination address of the packet differs from the source address of the packet.

2. The switch defined by claim 1 wherein each of said plurality of packet processing units is configured to:

receive the packet, decode the data therein and extract the addresses and message content;

determine switching requirements to direct the packet toward its at least zero destination network segments and provide temporary storage for the message content while said at least zero destination network segments are determined;

request a connectivity path through the switching matrix to provide a route for the transmitted data to the determined network segment;

create an appropriate header for the next segment of the packet travel; and transmit the header and attached the message content from temporary storage.

3. A switch according to claim 2 wherein said switching matrix operates to distribute a single packet to a plurality of destination addresses when a particular destination address is replaced by particular codes and where said codes imply a set of destination addresses previously defined.

4. A switch according to claim 1 adapted to distribute a single message to a plurality of receiving agents.

5. A switch according to claim 4 wherein the distribution of a single message to a plurality of receiving agents is achieved through:

a) distribution of a single packet between packet processing units via an internal special packet broadcast bus connecting all packet processing units within the switch; and b) distribution of the address of the plurality of receiving agents via a special header attached to the single packet.

6. A switch according to claim 5 wherein the packet processing units further comprise a pair of FIFOs, wherein a) one of said FIFOs is adapted to provide temporary storage of the message to be broadcast prior to its distribution to other packet processing units via a packet broadcast bus and b) a second one of said FIFOs is adapted to provide temporary storage of the message to be broadcast subsequent to its reception from a source packet processing unit via the packet control bus.

7. A switch as in claim 1, wherein the switching matrix provides a physical connectivity path between said processors and said network segments;

said switch further comprising:

a routing controller coupled between said switching matrix and each of said plurality of packet processing units, said routing controller adapted to accept switching requirements from each of the packet processing units and to generate therefrom signals to control the switching matrix, the switching matrix adapted to receive packets retransmitted from the packet processing units and to provide in response to signals from the routing controller a path for those packets to the selected segment, the routing controller being further adapted to acknowledge said packet processor units of pending switching route formation and provide instruction to said packet processor units to transmit selected packets to their network segment destination.

8. A switch according to claim 7 wherein the packet processing units are adapted to request routing paths and receive transmission commands from the routing controller.

9. A switch according to claim 7 wherein the routing controller determines when the path for each packet is available and when said path is available, configures the switching matrix and commands a predetermined one of the packet processing units to begin retransmission.

10. An apparatus to interconnect a plurality of network segments each of which operates in accordance with a bus protocol, said apparatus comprising:

a) a crossbar type switching mechanism disposed between outbound transmitting devices and a physical transmission medium;

b) N packet processing units each connected to an inbound port of a corresponding network segment and adapted to decode a source address and a destination address for each of a plurality of data packets received by said N packet processing units; and c) a routing controller that controls the switching mechanism.

11. An apparatus defined by claim 10 which each port is equipped with a special memory for temporary storage of broadcast and multicast messages, said special memory being connected to a broadcast distribution bus shared by the broadcast memories of all ports allowing broadcast and multicast messages to predetermined ones of said network segments through that bus.

12. An apparatus defined by claim 10 wherein each port includes address decoding and destination pointing circuitry connected to an address database to store and search network client addresses, and an address distribution bus shared by the address pointing circuits of all ports distributing the presence of an address on a given network segment to all such address pointing circuits and their associated address databases.

13. The apparatus defined by claim 10 wherein each of said packet processing units includes:

a receiving circuit;

a media access controller coupled to said receiving circuit;

a memory coupled to said media access controller for temporary packet storage;

a transmitting circuit coupled to said media access controller.

14. The switch of claim 10, wherein a media access controller is responsible for detecting collisions and errors between said packets, extracting addresses corresponding to said packets, maintaining statistics regarding movement of said packets, formatting and sending out said packets to said transmitter, and providing a plurality of elasticity buffers between a received data clock and a system clock.

15. The switch of claim 14, wherein a controller is responsible for controlling said media access controller, tracking said packets within memory, and interfacing to an address management unit as well as a routing controller.

16. A crossbar switch comprising:

first terminals for connection with a plurality of packet processing units connecting to receive data from associated inbound network segments, wherein each packet processing unit contains a first controller, a receiver, a transmitter, a media access controller, and a memory;

second terminals for connection with a plurality of outbound network segments; and a switch matrix coupled to said first and second terminals for selectively coupling selected ones of said first and second terminals such that a data packet received from a packet processing unit and an associated inbound network segment is switched directly to a different outbound network segment.

17. The crossbar switch defined by claim 16 wherein said crossbar switch is connected to a routing controller, said routing controller coupled to each of said plurality of packet processing units, said routing controller adapted to accept switching requirements from each of the packet processing units and to generate therefrom signals to control the crossbar switch, the crossbar switch adapted to receive packets retransmitted from the packet processing units and to provide in response to signals from the routing controller a path for those packets to the selected segment, the routing controller being further adapted to acknowledge said packet processor units of pending switch route formation and provide instruction to said packet processor units to transmit selected packets to their network segment destination.

18. The crossbar switch according to claim 17 wherein the routing controller determines when the path for each packet is available and when said path is available, configures the crossbar switching and commands a predetermined one of the packet processing units to begin retransmission.

* * * * *

UNITED STATES PATENT AND TRADEMARK OFFICE
CERTIFICATE OF CORRECTION

PATENT NO. : 6,763,030 B1
DATED : July 13, 2004
INVENTOR(S) : Alon Regev et al.

It is certified that error appears in the above-identified patent and that said Letters Patent is hereby corrected as shown below:

Column 1,
Lines 39 and 45, "prior are" should read -- prior art --;

Column 2,
Line 31, "b 1-n" should read -- 1-n --;
Line 42, "frame" should read -- frames --;

Column 5,
Line 18, "connected." should read -- connected through the crossbar switch matrix. --;

Column 6,
Line 52, "(4)" should read -- (14) --;

Column 7,
Line 9, "(2)" should read -- (21) --;
Line 18, "os the apparatus" should read -- of the apparatus --;
Line 59, "(9)" should read -- (19) --;

Column 8,
Line 31, "attached" should read -- attach --.

Signed and Sealed this

Fourteenth Day of February, 2006

JON W. DUDAS
*Director of the United States Patent and Trademark Office*